(No Model.)

O. J. PUNCHES.
CHAIR AND ROCKER FASTENER.

No. 346,560. Patented Aug. 3, 1886.

WITNESSES:
Della Steinhart.
Wm. F. Jewell

INVENTOR:
Oscar J. Punches
by E. W. Abbott
Atty

UNITED STATES PATENT OFFICE.

OSCAR J. PUNCHES, OF PLYMOUTH, ASSIGNOR OF ONE-HALF TO EDWIN W. ABBOTT AND ORSON ABBOTT, OF DETROIT, MICHIGAN.

CHAIR AND ROCKER FASTENER.

SPECIFICATION forming part of Letters Patent No. 346,560, dated August 3, 1886.

Application filed September 24, 1885. Serial No. 178,076. (No model.)

*To all whom it may concern:*

Be it known that I, OSCAR J. PUNCHES, a citizen of the United States, residing at Plymouth, in the county of Wayne and State of Michigan, have invented certain new and useful Improvements in a Chair and Rocker Fastener, of which the following is a specification.

The object of my invention is to provide a cheap, convenient, and durable detachable device for securing chairs, tables, or settees to floors, or for fastening rockers to chairs, as will be hereinafter set forth.

Figure 1 is a plan view of the chair and rocker fastener as cut from the metal before bending. Fig. 2 is an isometrical view of the fastener. Fig. 3 is a view of the fastener as attached to a chair-leg. Fig. 4 is an isometrical view of the fastener as attached to a chair-leg and fastened to a rocker.

In Fig. 1, A represents the fastener as it appears when first cut from the metallic sheet, which may be of copper, sheet-iron, block-tin, or any substance of sufficient weight and strength; or, if desired, it may be made of malleable iron. $a$ refers to the flanges, the dotted lines showing the place of bending the same. The holes $b$ are for screws or pins for securing the fasteners to the chair, rockers, or floor, as may be desired. The fasteners may be cut from a piece of metal two and one-half inches by three and one-half inches, thus giving one and one-half inch for the chair post or leg to rest on, and admitting of one inch on each side to turn up for the flanges, which are for the purpose of securing the attachment to the chair. The center hole is intended to admit of a screw or pin passing through the fastener and into the bottom of the chair-leg.

Figure 1:
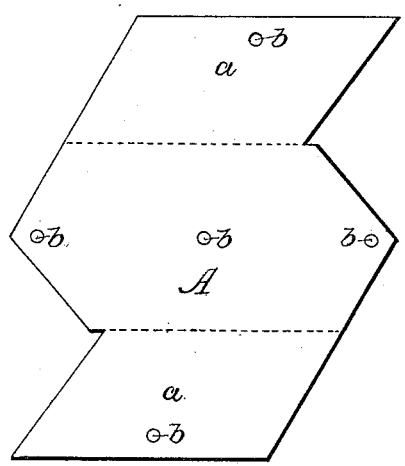
Figure 2:
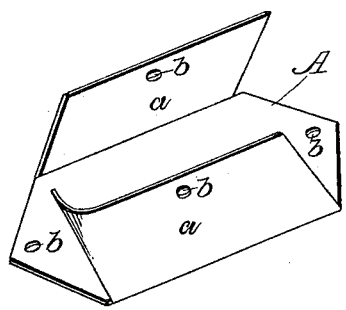
Fig. 2 shows the fasteners with the flanges $a$ turned up, with the long end of one of the flanges curved.
Figure 3:
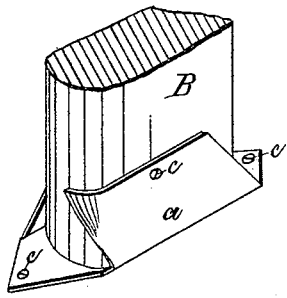
Fig. 3 shows the fastener attached to a chair-leg, B, with one end of the flange bent around the rounded portion of the leg. $c$ refers to the screws or pins for fastening the attachment to the chair leg, rockers, or floor, as heretofore mentioned.
Figure 4:
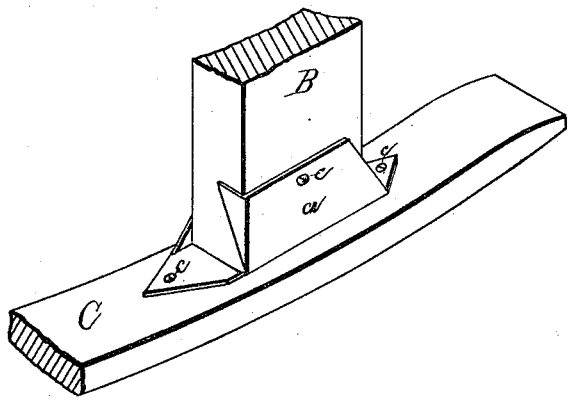
Fig. 4 shows the method of attaching the fastener to the chair-leg and securing the same to the rockers C.

I wish it to be understood that I do not limit myself to the size herein mentioned, as I design to make the fastener in several sizes, so as to be applicable to use in any place where a rocker is desired; neither is it necessary to curve the long end of the flange $a$. This is done only where the post or leg is round or smaller than the space designed to be filled by the same.

Although I have described this as a chair and rocker fastener, still I do not limit myself to that use only, as the fastener may be used in any place or manner for which it is adapted.

Having thus fully described my invention, what I claim, and desire to secure by Letters Patent, is—

The malleable plate A, having two rectangular rhomboidal wings, $a\ a$, and fastening-holes $b\ b$, as described, in combination with the chair-leg B and rocker C, all constructed and arranged substantially as and for the purpose set forth.

In testimony whereof I hereto affix my hand and seal, in presence of two witnesses, this 19th day of September, A. D. 1885.

OSCAR J. PUNCHES. [L. S.]

Witnesses:
 DELLA STEINHART,
 WM. F. JEWELL.